July 2, 1963

M. J. MILLER 3,095,663

ROD HOLDER FOR FISHING TACKLE BOXES

Filed Nov. 8, 1961

United States Patent Office 3,095,663
Patented July 2, 1963

3,095,663
ROD HOLDER FOR FISHING TACKLE BOXES
Marcell J. Miller, Penfield, N.Y., assignor to The Liberty Steel Chest Corporation, Rochester, N.Y., a corporation of New York
Filed Nov. 8, 1961, Ser. No. 150,978
2 Claims. (Cl. 43—21.2)

This invention relates to fishing tackle boxes, and more particularly to a fishing tackle box designed to hold a fishing pole or rod, thus providing on the box an inexpensive and satisfactory substitute for a commonly used seperate piece of equipment often called a rod rest.

An object of the invention is to provide a fishing tackle box which is designed to hold a fishing pole, thus permitting the fisherman the free use of both of his hands for other purposes, such as operating the motor of a boat while trolling, or preparing other lines for use.

Another object of the invention is to provide a tackle box which will hold a fishing pole at an angle of approximately 60° with the horizon to permit clearance of the reel and rod from the boat's sides while the tackle box is safely resting on the bottom of the boat.

A further object is to provide a fishing tackle box which can be used to hold a fishing pole in such a manner that the box will have maximum stability against the pull of the water when trolling and against the pull of a fish in the event of a strike.

A still further object of the invention is to provide a tackle box which can be used for holding a fishing pole whereby the fishing pole will be held securely against the pressure of water and in the event of a strike by a fish, while at the same time the pole may be easily released from the tackle box when the fisherman desires to play the fish actively.

Figure 1:
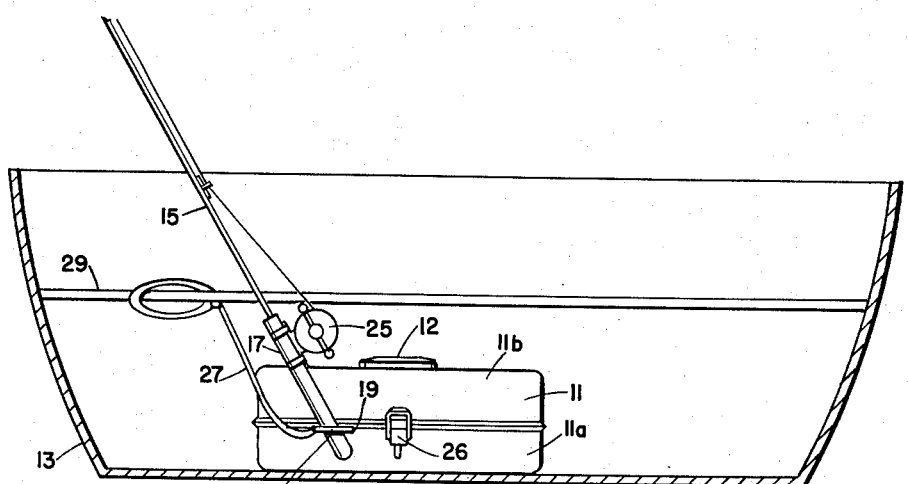
Figure 2:
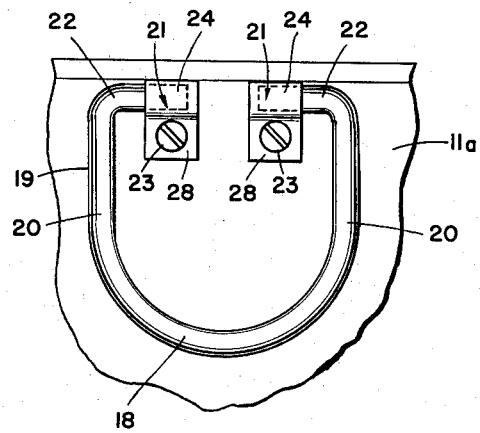

These and other desirable objects may be attained in the manner disclosed as an illustrative embodiment of the invention in the following description and in the accompanying drawings forming a part hereof, in which:

FIG. 1 illustrates the arrangement of a tackle box embodying the invention herein, the tackle box being shown holding a fishing pole as its rests in the bottom of a boat; and FIG. 2 is an enlarged view of the rigid loop which is attached to the front of the tackle box to accomplish the purposes of this invention.

Referring now to FIG. 1, a tackle box 11 having a main body or bottom section 11a and a top or cover section 11b hinged to each other along their rear edges in the conventional manner, and having a handle 12 on the top wall of the section 11b, is shown resting in the bottom of boat 13 (shown in beam cross section), and a fishing rod or pole 15 is shown with its handle 17 held in a rigid holder loop 19 of heavy metallic wire or the like.

The rigid loop 19 is formed of a length of wire having the central portion bent into curved or substantially semi-circular shape to form the outer end portion 18. Opposite end portions of the wire extend from the opposite ends of outer end portion 18 in spaced substantially parallel relation to form side portions 20 and the terminal portions 22 of the length of wire extend from the ends of side portions 22 opposite to outer end portion 18 inwardly toward each other in normal relation to side portions 18. The terminal portions 22 terminate in spaced relation and are arranged in alined substantially axial relation to form bearing portions.

As can be seen from FIG. 2, the loop 19 has inturned ends alined with each other and pivotally attached to the outside of a front vertical wall of the lower half 11a of the tackle box 11 by means of collars 21 which in turn are secured by screw-threaded bolts 23 or by rivets. The loops 21 are formed with cylindrical bearing portions 24 and attaching feet 28. The cylindrical portions 24 of loops 21 rotatably receive the inwardly extending terminal or bearing portions 22 for hingedly mounting the loop 19 on the wall of the tackle box. When not in use, the loop 19 hangs against the front wall of the tackle box 11, the loop 19 being loosely held by the collars 21 to be permitted to rotate or oscillate freely around the axis established by its bearing portions 24, the axis of rotation being substantially parallel to the bottom of the tackle box.

When used to hold a fishing pole as illustrated in FIG. 1, the free end of the loop 19 is raised until the surface of the loop 19 lies in a horizontal plane perpendicular to the vertical face of the tackle box 11 on which the loop is mounted. The butt of the handle 17 of the fishing rod 15 is then inserted into the loop 19. At the present time, most fishing poles are designed with handles having a diameter of approximately 1 inch, with the butt of the handle having a diameter of approximately 1⅛ inches. For use with such poles, it is suggested that the loop 19 be designed to have an inside width between bearing portions 24 and the inside of the central portion of outer end portion 18 (in a direction perpendicular to its axis of rotation) of 1¼ inches and an inside length (in a direction lengthwise of the tackle box) of approximately 1½ inches between the inner sides of side portions 20.

When designed with the approximate dimensions as just set forth above, when the fishing pole 15 is inserted into the loop 19 it will be held in approximately the position illustrated in FIG. 1, namely, at an angle of approximately 60° to the bottom of tackle box 11. It will be noted that this position permits the pole 15 to be maintained clear of the sides of the boat 13, and a reel 25 mounted on the handle 17 of the pole to be maintained clear of the top portion 11b of the tackle box 11. It will be understood that when the handle 17 of the fishing pole is inserted through loop 19 into the position shown in FIG. 1, it will result in opposite side portions of the handle engaging the side portions 20 of loop 19 intermediate the ends thereof. When the fishing pole is manually released, its weight will cause loop 19 to swing downwardly about bearing portions 24 until the inside surface along the handle engages the adjacent side wall of the tackle box. The opposite surface of the fishing pole handle will engage and substantially fit the inner curved surface of the outer end portion 18 of the loop 19. The inner portion of the handle 17 of the fishing pole will also engage the outer surfaces of the bearing portions 24 and the cooperation between outer end portion 18, bearing portions 24, the side wall of the fishing box and side portions 22 will effectively and rigidly lock the handle 17 to the tackle box.

The drag of a line while trolling, or the sudden pull exerted on a pole by a fish striking its lure, both tend to pull the head of the pole 15 in a downward direction, and the stronger this downward pull, the more firmly does the handle 17 press against the surfaces of the loop 19. On the other hand, should the fisherman desire to remove the pole 15 from the loop 19, he need merely raise the pole 15 to a more nearly vertical position, and the handle 17 may then be easily raised or withdrawn upwardly to be free of the loop 19.

Attention is called to the fact that the loop 19 is attached only to the lower half 11a of the front of the tackle box 11 at a point offset a few inches (preferably about 4 inches) from the centrally located latch 26 which conventionally holds the lid or cover 11b in closed relation to the body 11a. This is the preferred location for the loop when the tackle box is of the conventional length of about 18 or 20 inches. Thus, the torque exerted against the loop 19 by the handle 17 (when the rod 15 is being pulled downward by either drag or a fish striking) is resisted by the weight of the tackle box acting through an effective lever arm of approximately the full length of tackle box 11. This provides maximum stability for fishing pole 15, holding it much more securely than if the loop were attached to the end wall of the box, rather than the front wall.

Further, it should be noted that since the loop 19 is attached to the lower half of the front of the tackle box 11, the tackle box can be opened and used even when a fishing pole is being held by the loop 19.

A further use for the loop 19 is also illustrated in FIG. 1, which shows a line, cord, chain, or the like 27 having one of its ends tied to the loop 19 and the other secured around the thwart 29 of the boat 13, or secured to some other fixed part of the boat. Thus, the loop 19 may be used to secure the tackle box 11 to the boat 13 while at the same time permitting the full use of the tackle box 11. This prevents the box (and its contents, if the lid is properly latched by the latch 26) from being lost, if the boat is accidentally overturned, or if the box is pulled out of the boat by the force of a bite of an unexpectedly large fish before the fisherman has a chance to grab the pole. The regular handle 12 on the box cannot be used as satisfactorily for this purpose of securing the box to the boat, because that would interfere to some extent with opening the cover easily. Of course, a line attached to the loop 19 may be used as a "fish stringer" to hold the fish already caught, until they are to be taken away. All of these uses of the loop 19 (i.e., as a rod rest, and as means for safely anchoring the tackle box, and as means for attaching a "fish stringer" line) are equally available if the tackle box is used elsewhere than in a boat, e.g., if used on a dock, or on the bank of a stream. These uses do not interfere with the opening and closing of the cover of the tackle box.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A fishing tackle box, comprising a bottom section and a cover section hinged thereto along the rear edges, said bottom section having a front wall, a handle mounted on one of said sections in the central portion between opposite ends thereof, a holder loop having a length of wire formed with a curved outer end portion, a pair of spaced substantially parallel side portions extending from opposite ends of said curved outer end portion and having the free ends of said length of wire formed with terminal portions extending inwardly toward each other at the ends of said side portions opposite to said curved outer end portion, a pair of collars formed with bearing portions rotatably receiving said terminal portions with said collars arranged between said side portions in spaced relation, and means securing said collars to a side wall of said bottom section in spaced relation from the bottom wall and intermediate the central portion and one end thereof, said holder loop having the dimension between the side portions thereof approximately ten percent greater than the dimension between said terminal portions and said outer end portion, whereby the handle of a fishing rod will just clear the inner sides of said loop for insertion through and cooperation of said loop about an intermediate portion of said handle with the free end of said handle engaging the front wall of said bottom section below said loop and the other end carrying the fishing rod extending upwardly above the top of said tackle box in upwardly and outwardly inclined relation at an angle closer to vertical than horizontal for detachably locking said fishing rod handle to said bottom section.

2. A fishing tackle box comprising a bottom section and a cover section hinged thereto along the rear edges, said bottom section having a front wall, a carrying handle mounted on one of said sections in the central portion between opposite ends thereof, and a fishing rod supporting loop mounted for relative movement to and on said front wall between the transverse plane of said carrying handle and one end of said bottom section having collar means mounted on said front wall formed with bearing portions adjacent the edge of said wall, and a loop member formed with bearing portions rotatably engaged in the bearing portions of said collar means, side portions extending outwardly in substantially parallel relation from said bearing portions, and an outer end portion connecting the outer ends of said side portions, the dimension between the side portions being approximately ten percent greater than the dimension between said bearing portions and said outer end portion, whereby said rod supporting loop and the front wall of said bottom section cooperate to receive the handle of a fishing rod in an upwardly inclined position to extend through said loop member with the lower free end of the handle engaging the front wall of said bottom section below said loop member and said loop member embracing the sides of said handle and supporting said fishing rod in an upwardly inclined position extending above said box at one side thereof when said bottom section is seated on a supporting surface, and said top section being unobstructed for opening and closing movement thereof.

References Cited in the file of this patent

UNITED STATES PATENTS

| D. 187,867 | Boldosser | May 10, 1960 |
| 2,645,050 | Golias | July 14, 1953 |
| 2,816,390 | Vaughn et al. | Dec. 17, 1957 |